US012355175B2

(12) United States Patent
Noro et al.

(10) Patent No.: US 12,355,175 B2
(45) Date of Patent: Jul. 8, 2025

(54) FEMALE TERMINAL FITTING WITH ELASTIC CONTACT PIECE ENGAGEABLE WITH BODY PART

(71) Applicant: SUMITOMO WIRING SYSTEMS, LTD., Mie (JP)

(72) Inventors: Yutaka Noro, Mie (JP); Tetsuo Nawa, Mie (JP); Naomichi Kawashima, Mie (JP); Takahiro Tsuchiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 354 days.

(21) Appl. No.: 17/921,773

(22) PCT Filed: Mar. 24, 2021

(86) PCT No.: PCT/JP2021/012158
§ 371 (c)(1),
(2) Date: Oct. 27, 2022

(87) PCT Pub. No.: WO2021/220675
PCT Pub. Date: Nov. 4, 2021

(65) Prior Publication Data

US 2023/0170640 A1 Jun. 1, 2023

(30) Foreign Application Priority Data

Apr. 30, 2020 (JP) ................................. 2020-080460

(51) Int. Cl.
*H01R 13/11* (2006.01)
*H01R 13/193* (2006.01)
(Continued)

(52) U.S. Cl.
CPC ......... *H01R 13/114* (2013.01); *H01R 13/193* (2013.01); *H01R 4/185* (2013.01); *H01R 43/16* (2013.01)

(58) Field of Classification Search
CPC .... H01R 13/114; H01R 13/193; H01R 4/185; H01R 43/16
(Continued)

(56) References Cited

U.S. PATENT DOCUMENTS 5,217,382 A * 6/1993 Sparks .................. H01R 13/20
439/843
5,643,018 A * 7/1997 Sakai ................. H01R 13/5208
439/852
(Continued)

FOREIGN PATENT DOCUMENTS

DE 10012262 C2 * 10/2002 ............. H01R 13/11
EP 1215764 A2 * 6/2002 ........... H01R 13/187
(Continued)

OTHER PUBLICATIONS

International Search Report issued on Jun. 15, 2021 for WO 2021/220675 A1 (6 pages).

*Primary Examiner* — Peter G Leigh
(74) *Attorney, Agent, or Firm* — Venjuris, P.C.

(57) ABSTRACT

Provided is a female terminal fitting that can realize a state in which an elastic contact piece stably engages a main body part. A female terminal fitting includes a tubular main body part and an elastic contact piece that is provided inside the main body part and deflectively deforms in the plate thickness direction. The main body part has a right side plate. The right side plate is provided with a right rear opening. An edge part of the right rear opening is provided with a first regulating part bent to the inner side of the main body part. The elastic contact piece has a rear side projecting part positioned in the right rear opening and a region opposing the first regulating part in the plate thickness direction of the elastic contact piece together with the rear side projecting part.

8 Claims, 14 Drawing Sheets

(51) Int. Cl.
*H01R 4/18* (2006.01)
*H01R 43/16* (2006.01)

(58) Field of Classification Search
USPC .......................................................... 439/852
See application file for complete search history.

(56) References Cited

U.S. PATENT DOCUMENTS

| | | | | |
|---|---|---|---|---|
| 5,810,627 A * | 9/1998 | Gierut | H01R 13/187 | 439/843 |
| 6,056,604 A * | 5/2000 | Roy | H01R 13/187 | 439/845 |
| 6,196,884 B1 * | 3/2001 | Tanaka | H01R 13/187 | 439/847 |
| 6,247,975 B1 * | 6/2001 | Cue | H01R 13/187 | 439/852 |
| 6,475,040 B1 * | 11/2002 | Myer | H01R 13/11 | 439/852 |
| 6,527,600 B2 * | 3/2003 | Alonso Merino | H01R 13/193 | 439/842 |
| 7,175,486 B2 * | 2/2007 | Noro | H01R 13/422 | 439/839 |
| 7,223,135 B2 * | 5/2007 | Nora | H01R 13/113 | 439/852 |
| 7,252,562 B1 * | 8/2007 | Chen | H01R 13/187 | 439/852 |
| 7,530,859 B2 * | 5/2009 | Moll | H01R 13/113 | 439/852 |
| 8,241,075 B2 * | 8/2012 | Ishikawa | H01R 13/113 | 439/851 |
| 8,784,144 B2 * | 7/2014 | Hirabayashi | H01R 13/113 | 439/852 |
| 9,601,854 B2 * | 3/2017 | Kutsuna | H01R 13/11 | |
| 2006/0172615 A1 | 8/2006 | Noro et al. | | |
| 2006/0172620 A1 | 8/2006 | Noro et al. | | |
| 2012/0034827 A1 | 2/2012 | Ishikawa et al. | | |
| 2020/0083618 A1 | 3/2020 | Mochizuki et al. | | |

FOREIGN PATENT DOCUMENTS

| | | | | |
|---|---|---|---|---|
| EP | 1990867 A2 * | 11/2008 | H01R 13/113 |
| JP | S61-074967 U | 5/1986 | |
| JP | 07220792 A * | 8/1995 | H01R 13/187 |
| JP | 2988608 B2 * | 12/1999 | H01R 13/187 |
| JP | 2001506048 A * | 5/2001 | H01R 13/113 |
| JP | 2001-210418 A | 8/2001 | |
| JP | 3285101 B2 * | 5/2002 | H01R 13/187 |
| JP | 3544133 B2 * | 7/2004 | H01R 13/113 |
| JP | 2011154944 A * | 8/2011 | H01R 13/187 |
| JP | 2011-216435 A | 10/2011 | |
| JP | 2012-038553 A | 2/2012 | |
| JP | 2014-160544 A | 9/2014 | |

* cited by examiner

FEMALE TERMINAL FITTING WITH ELASTIC CONTACT PIECE ENGAGEABLE WITH BODY PART

CROSS REFERENCE TO RELATED APPLICATIONS

This application is a national phase of PCT application No. PCT/JP2021/012158, filed on 24 Mar. 2021, which claims priority from Japanese patent application No. 2020-080460, filed on 30 Apr. 2020, all of which are incorporated herein by reference.

TECHNICAL FIELD

The present disclosure relates to a female terminal fitting.

BACKGROUND

A female terminal of Patent Document 1 includes a tubular main body part into which a male tab on the partner side is inserted and an elastic contact piece that is deflectably disposed inside the main body part. The elastic contact piece is provided with a protruding piece protruding in the width direction. A sidewall of the main body part is provided with a through hole. On the edge of the through hole, an excessive deflection regulating part that regulates excessive deflection of the elastic contact piece is provided opposing the protruding piece of the elastic contact piece. The terminal fittings of Patent Documents 2 to 4 are also similarly configured to regulate excessive deflection of the elastic contact piece with a regulating part of the main body part.

PRIOR ART DOCUMENT

Patent Document

Patent Document 1: JP 2014-160544 A
Patent Document 2: JP 2012-038550 A
Patent Document 3: JP 2006-216315 A
Patent Document 4: JP S61-074967 U1

SUMMARY OF THE INVENTION

Problems to be Solved

In the female terminal of Patent Document 1, only the distal end of the protruding piece of the elastic contact piece opposes the edge of the through hole in the up-down direction, and thus the engagement allowance of the elastic contact piece with respect to the edge of the through hole is relatively small. Thus, issues such as displacement of the elastic contact piece being difficult to regulate stably with the excessive deflection regulating part or the protruding piece of the elastic contact piece coming out of the through hole due to the wall thickness of the sidewall of the main body part being thin could possibly arise.

The present disclosure has been completed based on circumstances such as the above, and an object thereof is to provide a female terminal fitting that can realize a state in which an elastic contact piece stably engages a main body part.

Means to Solve the Problem

A female terminal fitting of the present disclosure includes:

a tubular main body part; and an elastic contact piece provided inside the main body part and deflectively deforming in a plate thickness direction, the main body part having a side plate, the side plate being provided with a hole, an edge part of the hole being provided with a bent part bent to an inner side of the main body part, and the elastic contact piece having:

a projecting part that enters the hole; and a region opposing the bent part in the plate thickness direction of the elastic contact piece together with the projecting part.

Effect of the Invention

According to the present disclosure, a female terminal fitting that can realize a state in which an elastic contact piece stably engages a main body part can be provided.

DETAILED DESCRIPTION TO EXECUTE THE INVENTION

Description of Embodiments of Disclosure

Figure 1:
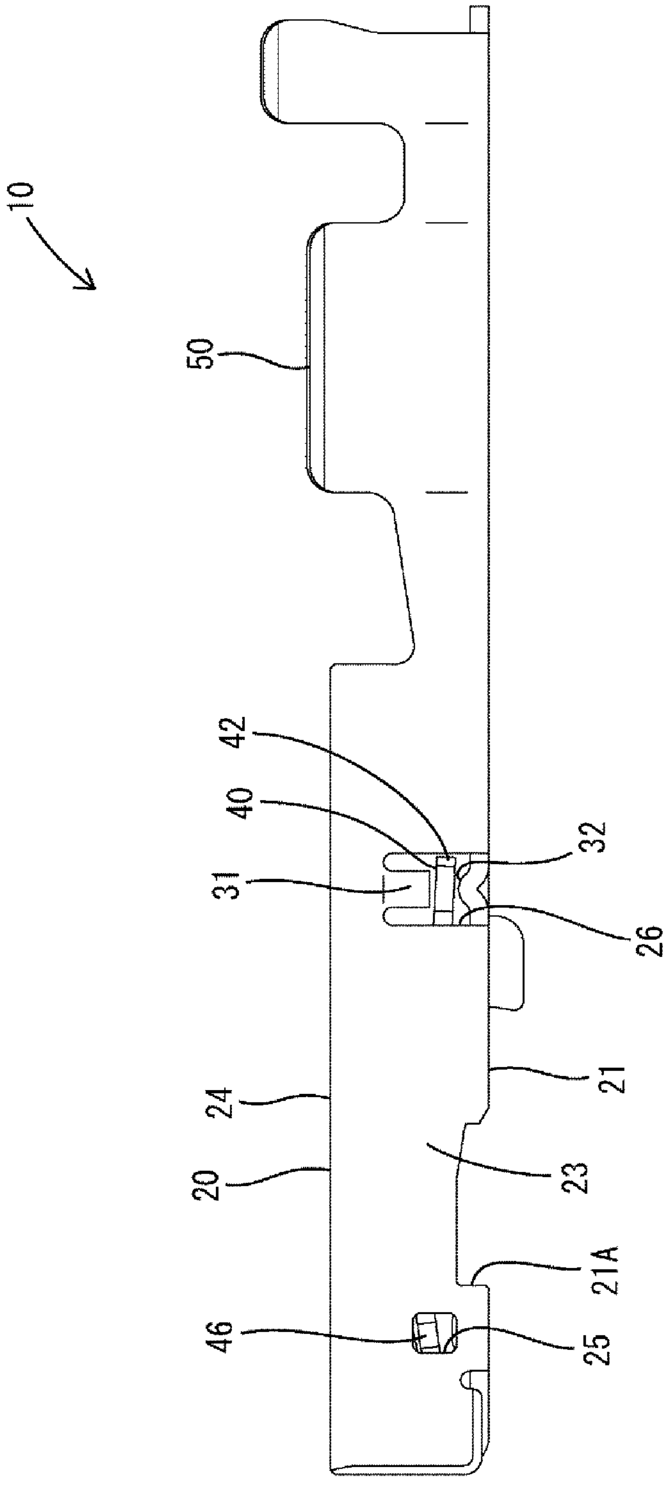
FIG. 1 is a right side view of a female terminal fitting of a first embodiment.

Initially, embodiments of the present disclosure will be enumerated and described.

A female terminal fitting of the present disclosure includes:

(1) a tubular main body part and an elastic contact piece provided inside the main body part and deflectively deforming in a plate thickness direction, the main body part having a side plate, the side plate being provided with a hole, an edge part of the hole being provided with a bent part bent to an inner side of the main body part, and the elastic contact piece having a projecting part that enters the hole and a region opposing the bent part in the plate thickness direction of the elastic contact piece together with the projecting part.

The elastic contact piece has a region opposing the bent part of the main body part in the plate thickness direction of the elastic contact piece together with the extension part. Thus, the engagement allowance of the main body part and the elastic contact piece can be increased. A state in which the elastic contact piece stably engages the main body part can thereby be realized.

(2) Preferably, the bent part is bent to the inner side of the main body part so as to incline relative to a plate surface of the side plate.

With this configuration, the engagement allowance with the bent part can be increased, by the amount that the bent part inclines relative to the plate surface of the side plate.

(3) Preferably, the bent part has a bending angle of 45 degrees or less with respect to the plate surface of the side plate.

With this configuration, the engagement allowance of the main body part and the elastic contact piece can be increased without excessively widening the interval between the bent part and the hole.

(4) Preferably, the bent part is bent avoiding an insertion path of a male tab within the main body part.

With this configuration, the male tab that is inserted in the main body part does not interfere with the bent part, and damage to the bent part and the male tab can be avoided.

(5) Preferably, the main body part is divided into an insertion side on which the insertion path is arranged and a non-insertion side, via the elastic contact piece, and the bent part is located on the insertion side of the main body part.

With this configuration, the freedom of design of the main body part can be increased.

(6) Preferably, the main body part has a regulating part that comes into contact with the elastic contact piece and regulates a displacement range of the elastic contact piece to less than or equal to a plate thickness of the elastic contact piece.

With this configuration, by regulating the displacement range of the elastic contact piece to less than or equal to the plate thickness with the regulating part, the displacement amount of the elastic contact piece can be suppressed, as compared with the case where the displacement range is larger than the plate thickness. Thus, stress that occurs on the elastic contact piece when an external force is applied to the elastic contact piece (e.g., when vibration occurs during transportation) can be reduced, and damage to the elastic contact piece is more easily avoided.

Detailed Description of Embodiments of Disclosure

First Embodiment

A first embodiment embodying a female terminal fitting of the present disclosure will be described with reference to FIGS. 1 to 11. In the first embodiment, with regard to the front and rear directions, leftward in FIGS. 1, 4 to 8, 10 and 11 is frontward and rightward is rearward. With regard to the up and down directions, upward and downward as they appear in FIGS. 1 to 3, 6 and 8 to 11. With regard to the left and right directions, rightward in FIG. 9 is leftward and leftward is rightward.

Figure 6:
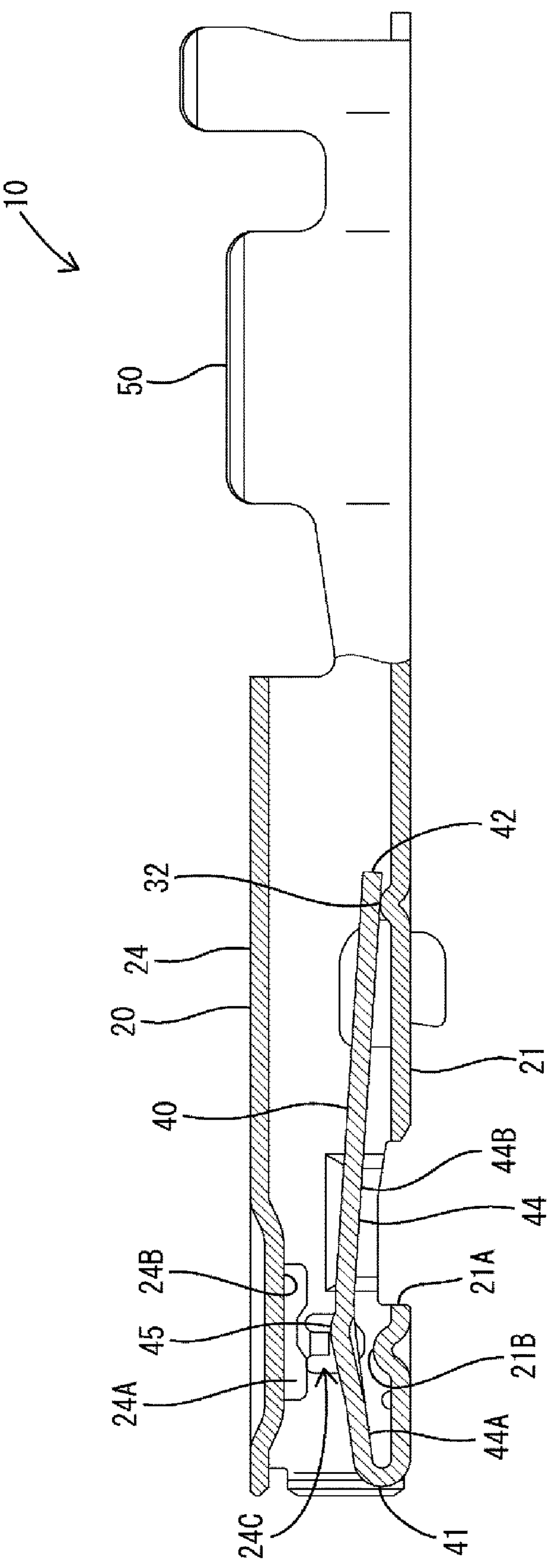
FIG. 6 is a cross-sectional view taken along A-A in FIG. 2.
Figure 11:
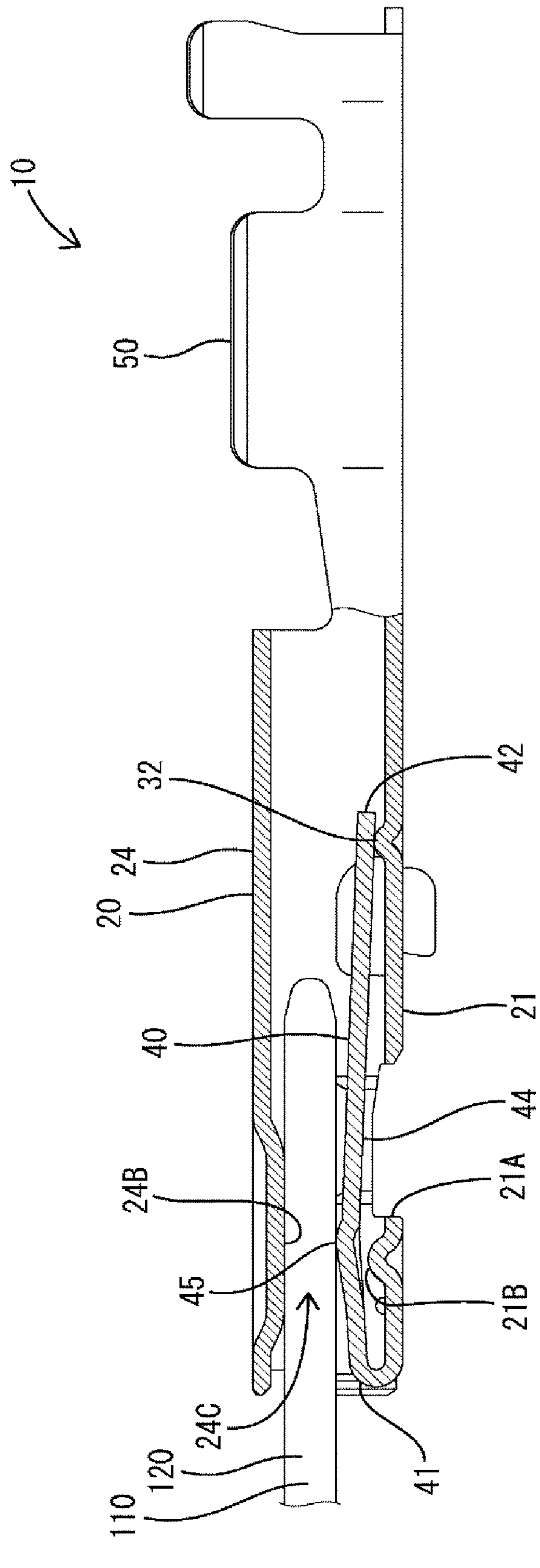
FIG. 11 is an illustrative diagram illustrating a state in which a male tab is inserted in a main body part.

A female terminal fitting 10 of the first embodiment shown in FIG. 1 is integrally formed by a process such as bending a conductive metal plate, and is connectable to a partner-side male terminal fitting 110 shown in FIG. 11. As shown in FIG. 6, the female terminal fitting 10 includes a main body part 20, an elastic contact piece 40 and a wire connecting part 50. The wire connecting part 50 has an open barrel shape, and a terminal part of an electrical wire is conductively connected by crimping.

Figure 2:
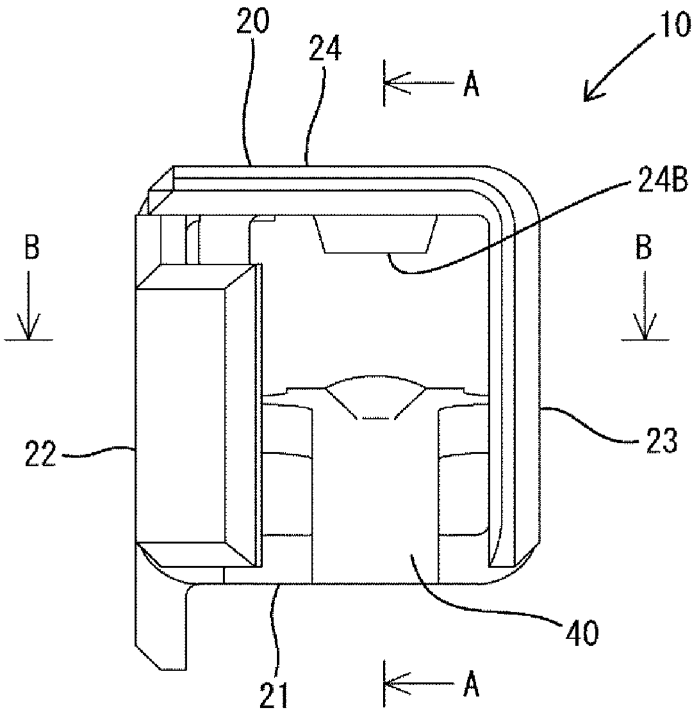
FIG. 2 is a front view of the female terminal fitting.
Figure 5:
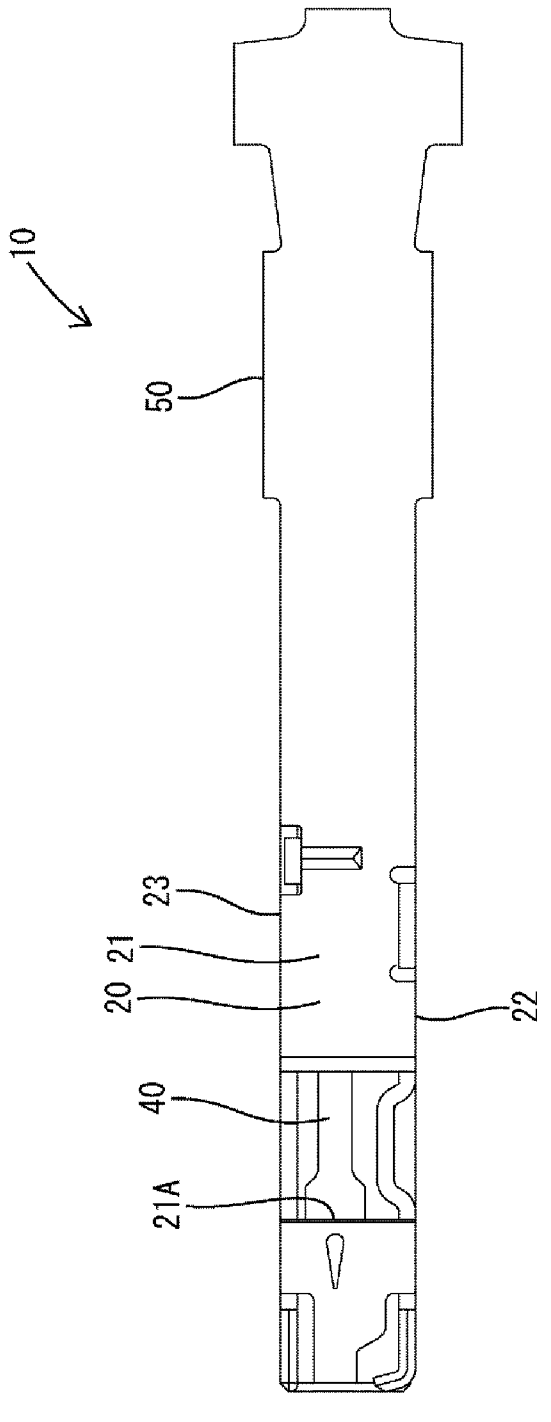
FIG. 5 is a bottom view of the female terminal fitting.

As shown in FIGS. 1 and 2, the main body part 20 has a rectangular tube shape that is hollow throughout in the front-rear direction. A male tab 120 (see FIG. 11) of the male terminal fitting 110 is inserted into the main body part 20. The main body part 20 includes a bottom plate 21, a left side plate 22 (see FIG. 3), a right side plate 23 and a top plate 24. The bottom plate 21 is a plate that is elongated in the front-rear direction. As shown in FIG. 5, the bottom plate 21 is provided with a lance hole 21A. The lance hole 21A is open in a rectangular shape across the entirety of the bottom plate 21 in the left-right direction. As shown in FIG. 6, the bottom plate 21 is provided with a protruding part 21B on the frontward side of the lance hole 21A. The protruding part 21B is formed by being hammered out from the downward side, for example. The left side plate 22 and the right side plate 23 respectively stand erect from the left and right edges of the bottom plate 21.

Figure 7:
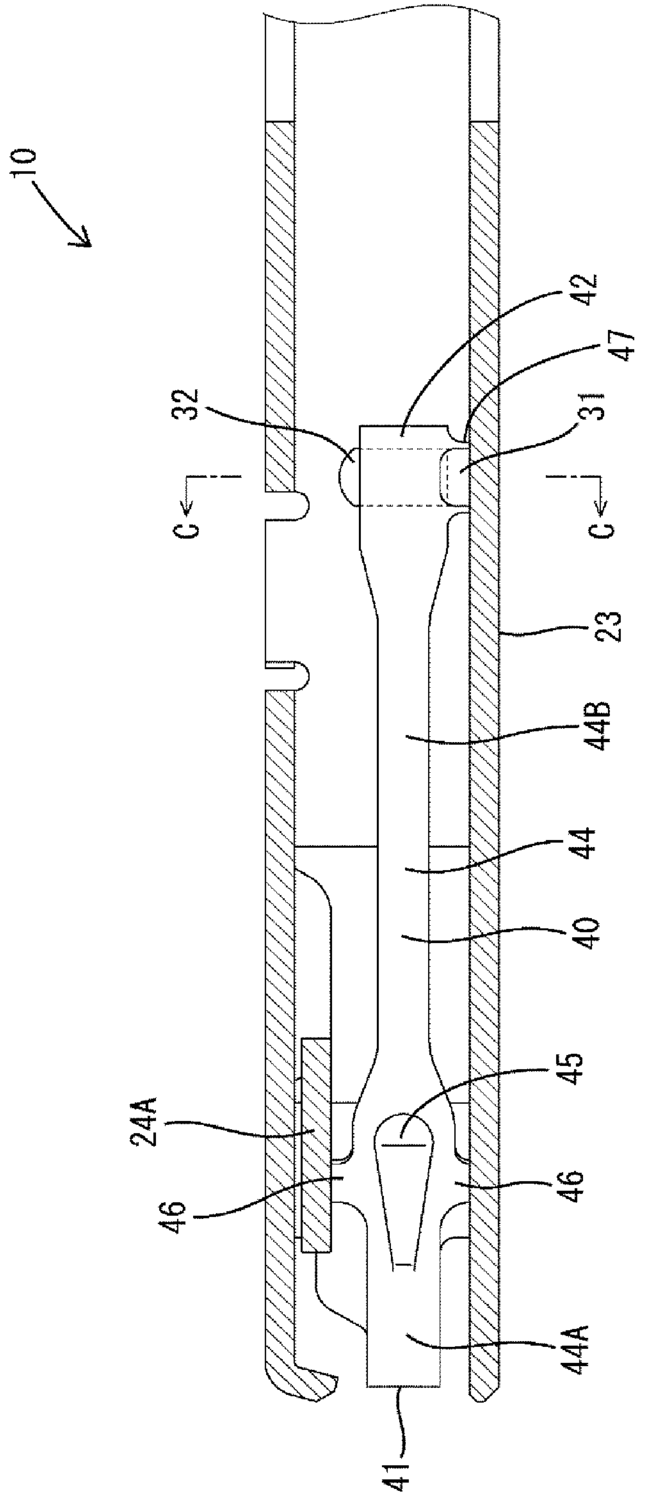
FIG. 7 is a cross-sectional view taken along B-B in FIG. 2.

The top plate 24 extends from the erect upper end of the right side plate 23 to the left side plate 22 side in parallel with the bottom plate 21. Part of the left edge of the top plate 24 contacts the upper end of the left side plate 22 from the upper side. As shown in FIGS. 6 and 7, a portion of the left edge of the top plate 24 that does not contact the upper end of the left side plate 22 is provided with a front side engaging plate 24A that extends downward along the inner surface of the left side plate 22 (so as to overlap therewith).

As shown in FIG. 6, a tab receiving part 24B is formed in the top plate 24 by being downwardly hammered out. A tab entry space (insertion path) 24C for the male tab 120 inserted into the main body part 20 from the front to enter is formed between the lower surface of the tab receiving part 24B and the upper surface of the elastic contact piece 40 described later.

Figure 3:
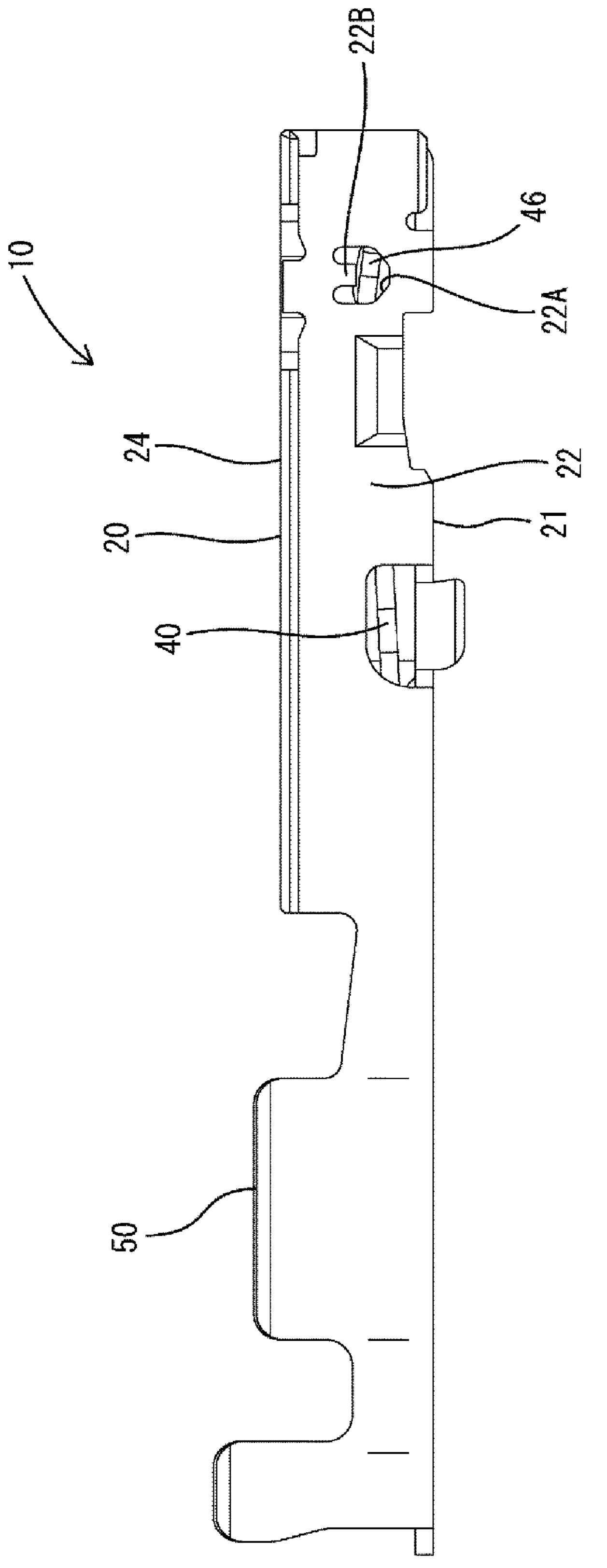
FIG. 3 is a left side view of the female terminal fitting.
Figure 4:
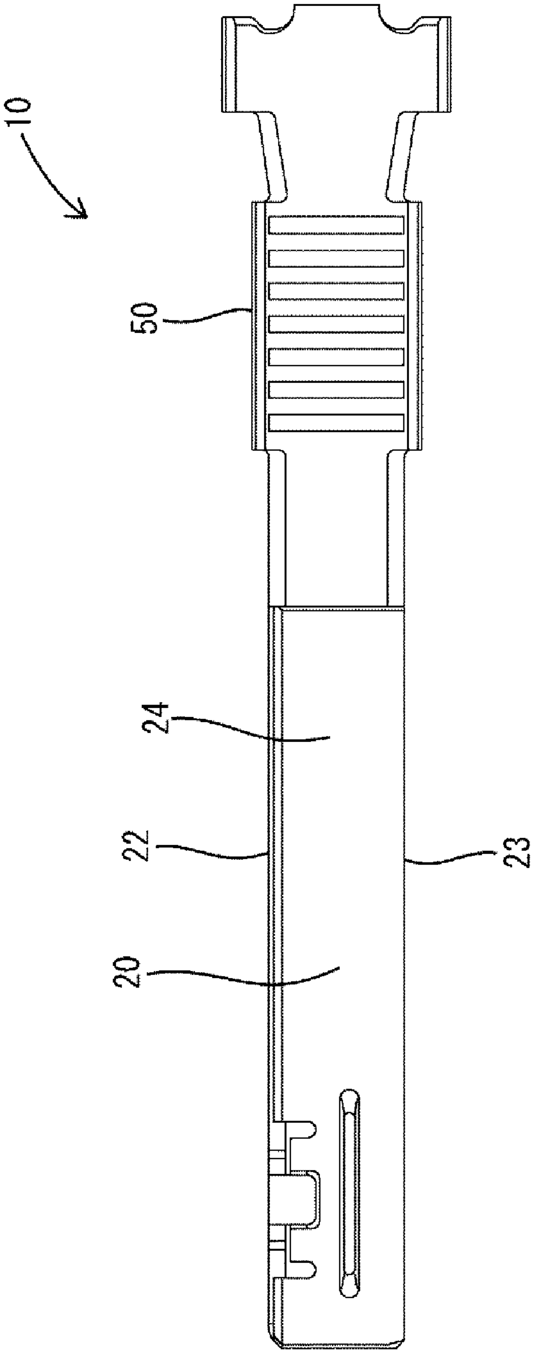
FIG. 4 is a plan view of the female terminal fitting.

As shown in FIG. 3, the left side plate 22 is provided with a left front opening 22A at a position on the front end part side. The left front opening 22A is provided with an extension piece 22B. The extension piece 22B extends downward from an upper edge part of the left front opening 22A.

As shown in FIG. 1, the right side plate 23 is respectively provided with a right front opening 25 and a right rear opening (hole) 26 at front and rear positions. The right front opening 25 is provided at a position corresponding to the lower end of the front side engaging plate 24A (position overlapping therewith in left-right direction). The right front opening 25 has a rectangular shape. The right rear opening 26 is provided at a position corresponding to a second regulating part 32 described later (position overlapping therewith in left-right direction). The right rear opening 26 has a rectangular shape.

Figure 8:
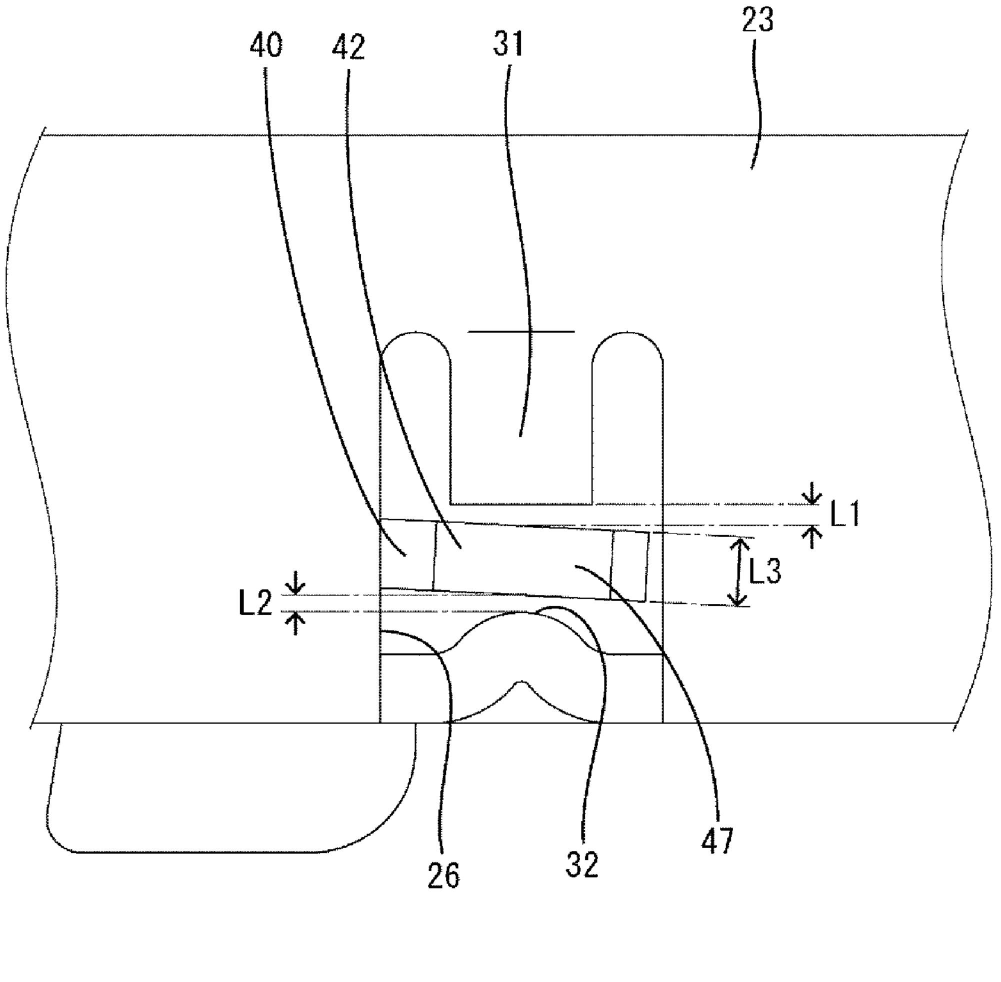
FIG. 8 is an enlarged view showing the periphery of a right rear opening in FIG. 1 in an enlarged manner.
Figure 9:
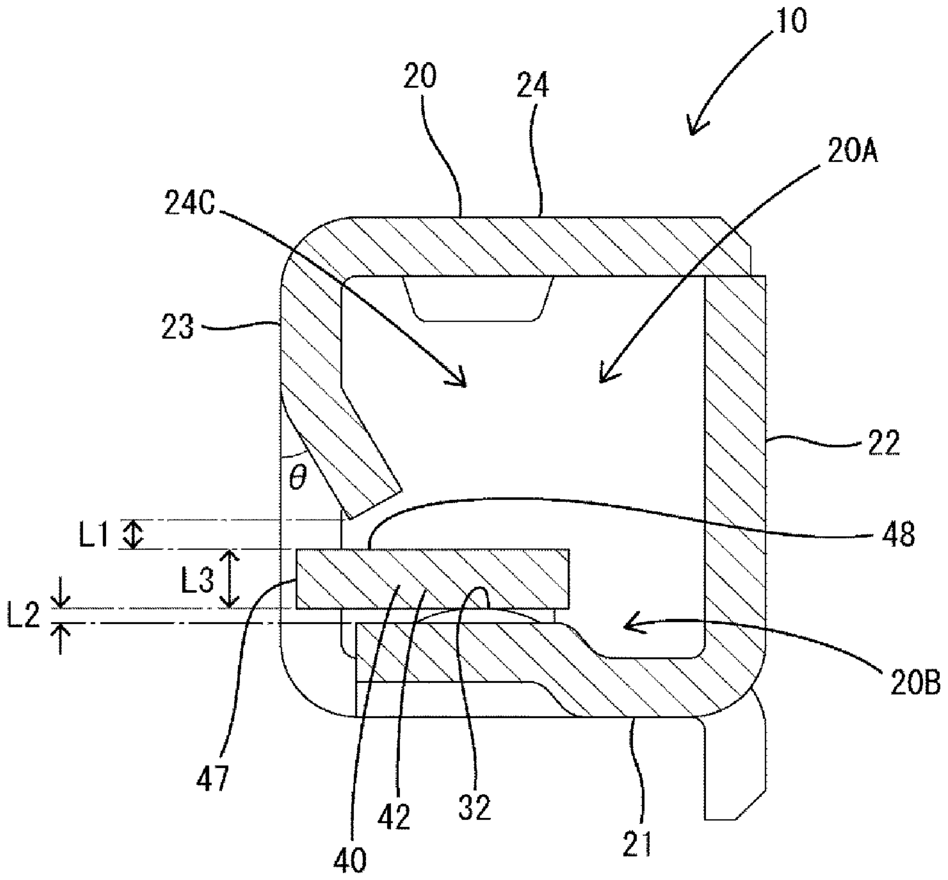
FIG. 9 is a cross-sectional view taken along C-C in FIG. 7.

As shown in FIG. 8, the main body part 20 is provided with a first regulating part (bent part) 31 and the second regulating part 32. The first regulating part 31 and the second regulating part 32 come in contact with the elastic contact piece 40 and regulate a displacement range of a free end part 42 side of the elastic contact piece 40. The first regulating part 31 is provided on an erect side (edge part on upper side) of the right rear opening 26. The first regulating part 31 is a rectangular plate-shaped protruding piece protruding from the edge part on the upper side of the right rear opening 26. As shown in FIG. 9, the first regulating part 31 is bent to the inner side of the main body part 20. The first regulating part 31 is bent to the inner side of the main body part 20 so as incline relative to the plate surface of the right side plate 23. The first regulating part 31 has a bending angle θ of 45 degrees or less with respect to the plate surface of the right side plate 23, and preferably 30 degrees, for example.

As shown in FIG. 9, the first regulating part 31 is bent avoiding the insertion path (tab entry space 24C) of the male tab 120 within the main body part 20. That is, the first regulating part 31 is located on the right side away from the tab entry space 24C.

As shown in FIG. 9, the main body part 20 is divided into an insertion side 20A of the male tab 120 and a non-insertion side 20B of the male tab 120, via the elastic contact piece 40. The tab entry space 24C is arranged on the insertion side 20A. In the main body part 20, the portion on the upward side of the elastic contact piece 40 is the insertion side 20A, and the portion on the downward side of the elastic contact piece 40 is the non-insertion side 20B. The first regulating part 31 is located on the insertion side 20A of the main body part 20.

As shown in FIG. 8, the second regulating part 32 is provided at a position on an opposite side (downward side) to the first regulating part 31 across the free end part 42 of the elastic contact piece 40. As shown in FIG. 6, the second regulating part 32 is provided on the bottom plate 21. The second regulating part 32 is provided at a position rearward of the lance hole 21A in the bottom plate 21. The second regulating part 32 supports the elastic contact piece 40 from below. The second regulating part 32 is formed to protrude by being hammered out from the downward side, for example. The second regulating part 32 comes in contact with the free end part 42 of the elastic contact piece 40 that is elastically deflected due to interference with the male tab 120, and supports the elastic contact piece 40.

As shown in FIG. 6, the elastic contact piece 40 is housed within the main body part 20. The elastic contact piece 40 contacts the male tab 120 (see FIG. 11) of the male terminal fitting 110 inserted in the main body part 20. As shown in FIG. 6, the elastic contact piece 40 doubles back from the front end of the bottom plate 21 and extends rearward in a cantilever manner. The elastic contact piece 40 has a shape elongated in the front-rear direction, extending from a support point part (bent part) 41 to the free end part 42. The support point part 41 has a semicircular arc shape continuous with the front end of the bottom plate 21. The elastic contact piece 40 has an extension part 44. The extension part 44 extends rearward from the support point part 41. The extension part 44 is provided with a front inclining part 44A and a rear inclining part 44B. The front inclining part 44A extends rearward diagonally upward from the upper end of the support point part 41. The rear inclining part 44B extends rearward diagonally downward from the rear end of the front inclining part 44A.

In a free state (natural state) in which the elastic contact piece 40 is not elastically deflected, the free end part 42 is in a non-contact position upward of the bottom plate 21. Thus, the elastic contact piece 40 is in a state of being supported in a cantilever manner at the front end thereof by the bottom plate 21. The elastic contact piece 40 can be elastically deformed in the up-down direction while elastically deflecting mainly at the support point part 41, with the support point part 41 as the support point. The free end part 42 side of the elastic contact piece 40 displaces in the plate thickness direction of the elastic contact piece 40. The elastic contact piece 40, when elastically deflected downward, will be supported at both the front and rear ends, due to the free end part 42 coming in contact with the second regulating part 32 of the bottom plate 21.

As shown in FIG. 6, the rear end (highest portion) of the front inclining part 44A is provided with a contact point part 45 in a form upwardly hammered out into a dome shape. The contact point part 45 contacts the male tab 120 (see FIG. 11). The distance from the support point part 41 to the contact point part 45 is smaller than the distance from the contact point part 45 to the free end part 42.

As shown in FIG. 7, a pair of front side projecting parts 46 is provided on left and right edge parts of the front end part side of the elastic contact piece 40. The front side projecting parts 46 are in a form projecting in a flush manner outwardly in the width direction. The front side projecting parts 46 are arranged in the vicinity of the contact point part 45, that is, in a position slightly frontward of the contact point part 45. As shown in FIG. 3, the front side projecting part 46 on the left side is positioned so as to correspond to the left front opening 22A in the front-rear direction. In the free state (natural state) in which the elastic contact piece 40 is not elastically deflected, the upper surface of the front side projecting part 46 on the left side is in a non-contact position slightly downward of the lower edge part of the extension piece 22B. The front side projecting part 46 on the right side is positioned so as to correspond to the right front opening 25 in the front-rear direction. In the free state (natural state) in which the elastic contact piece 40 is not elastically deflected, the upper surface of the front side projecting part 46 on the right side is in a non-contact position slightly downward of the upper edge part of the right front opening 25.

Figure 10:
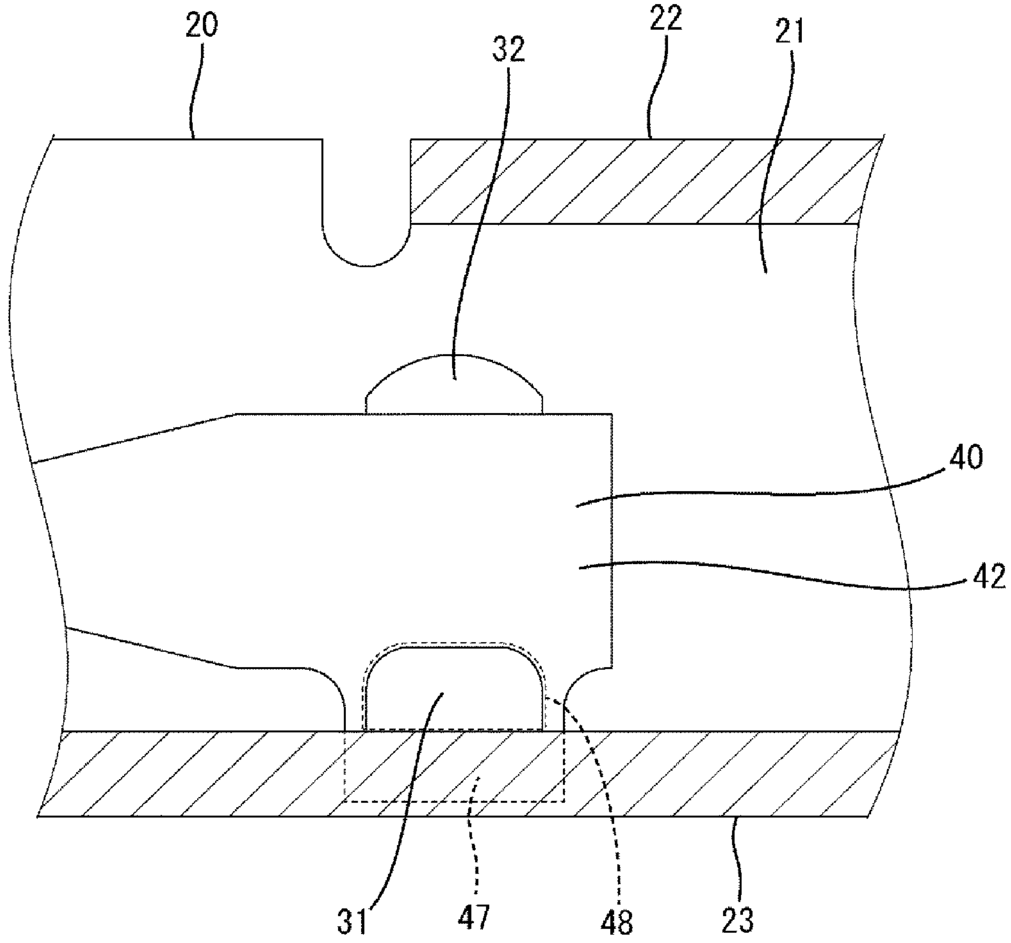
FIG. 10 is an enlarged view showing the periphery of a free end part of an elastic contact piece in FIG. 7 in an enlarged manner.

As shown in FIGS. 7 and 10, a rear side projecting part 47 is provided on the right side edge part of the rear end part side of the elastic contact piece 40. The rear side projecting part 47 is in a form projecting in a flush manner outwardly in the width direction. The rear side projecting part 47 projects in the width direction (right direction) from the free end part 42 side. The rear side projecting part 47 constitutes part of the free end part 42. The rear side projecting part 47 is positioned so as to correspond the right rear opening 26 in the front-rear direction. The rear side projecting part 47 is located within the right rear opening 26. In the free state (natural state) in which the elastic contact piece 40 is not elastically deflected, the upper surface of the rear side projecting part 47 is in a non-contact position slightly downward of the first regulating part 31. At this time, the distance between the upper surface of the rear side projecting part 47 and the first regulating part 31 is smaller than the plate thickness of the elastic contact piece 40. The lower surface of the free end part 42 including the rear side projecting part 47 on the right side is in close proximity to the second regulating part 32. Note that the lower surface of the free end part 42 may contact the second regulating part 32.

The first regulating part 31 and the second regulating part 32 come in contact with the elastic contact piece 40 and regulate the displacement range of the free end part 42 side of the elastic contact piece 40 to less than or equal to the plate thickness of the elastic contact piece 40. That is, the free end part 42 of the elastic contact piece 40 displaces by a distance less than or equal to the plate thickness of the elastic contact piece 40 when changing between the state of coming in contact with the first regulating part 31 and the state of coming in contact with the second regulating part 32 (when displacing in up-down direction).

As shown in FIG. 8, the distance between a center position of the upper surface of the rear side projecting part 47 in the front-rear direction and the lower end of the first regulating part 31 is L1. The distance between a center position of the lower surface of the rear side projecting part 47 in the front-rear direction and the upper end of the second regulating part 32 is L2. The sum of L1 and L2 is smaller than a plate thickness L3 of the elastic contact piece 40. When the elastic contact piece 40 is in the free state (natural state), L1 is larger than L2.

As shown in FIG. 10, the elastic contact piece 40 has a region (extended region) 48 opposing the first regulating part 31 in the plate thickness direction of the elastic contact piece 40 together with the rear side projecting part 47. The region 48 of the elastic contact piece 40 is a portion that overlaps with the first regulating part 31 in the up-down direction. The region 48 is a portion that is long in the front-rear direction and adjacent on the left side to the rear side projecting part 47. The length of the region 48 in the front-rear direction is about the same as the length of the first regulating part 31 in the front-rear direction. In this way, due to the first regulating part 31 being bent, the engagement allowance of the main body part 20 and the elastic contact piece 40 can be increased by the size of the region 48, as compared with a configuration in which the first regulating part 31 is not bent.

When connecting the male terminal fitting 110 to the female terminal fitting 10, the male tab 120 is inserted into the tab entry space 24C of the main body part 20 from the frontward side. The male tab 120 inserted in the tab entry space 24C is elastically sandwiched between the tab receiving part 24B and the contact point part 45 while elastically deflecting the elastic contact piece 40. The male tab 120 and the main body part 20 are conductively connected due to the elastic restoring force of the elastic contact piece 40.

As described above, in the female terminal fitting 10 of the present disclosure, the elastic contact piece 40 has the region 48 opposing the first regulating part 31 of the main body part 20 in the plate thickness direction of the elastic contact piece 40 together with the rear side projecting part 47. Thus, the engagement allowance of the main body part 20 and the elastic contact piece 40 can be increased. A state in which the elastic contact piece 40 stably engages the main body part 20 can thereby be realized.

In the female terminal fitting 10 of the present disclosure, the first regulating part 31 is bent to the inner side of the main body part 20 so as to incline relative to the plate surface of the right side plate 23. With this configuration, the engagement allowance with the first regulating part 31 can be increased by the amount that the first regulating part 31 inclines relative to the plate surface of the right side plate 23.

In the female terminal fitting 10 of the present disclosure, the first regulating part 31 has a bending angle of 45 degrees or less with respect to the plate surface of the right side plate 23. With this configuration, the engagement allowance of the main body part 20 and the elastic contact piece 40 can be increased, without excessively widening the interval between the first regulating part 31 and the right rear opening 26.

In the female terminal fitting 10 of the present disclosure, the first regulating part 31 is bent avoiding the tab entry space 24C into which the male tab 120 is inserted within the main body part 20. With this configuration, the male tab 120 that is inserted within the main body part 20 does not interfere with the first regulating part 31, and damage to the first regulating part 31 and the male tab 120 can be avoided.

In the female terminal fitting 10 of the present disclosure, the main body part 20 is divided into the insertion side 20A on which the tab entry space 24C is arranged and the non-insertion side 20B, via the elastic contact piece 40, and the first regulating part 31 is located on the insertion side 20A of the main body part 20. With this configuration, the freedom of design of the main body part 20 can be increased.

The female terminal fitting 10 of the present disclosure is able to suppress the displacement amount of the elastic contact piece 40, as compared with the case where the displacement range is larger than the plate thickness, by regulating the displacement range of the elastic contact piece 40 to less than or equal to the plate thickness with the first regulating part 31 and the second regulating part 32. Thus, stress that occurs on the elastic contact piece 40 when an external force is applied to the elastic contact piece 40 (e.g., when vibration occurs during transportation) can be reduced, and damage to the elastic contact piece 40 is more easily avoided.

Second Embodiment

Figure 12:
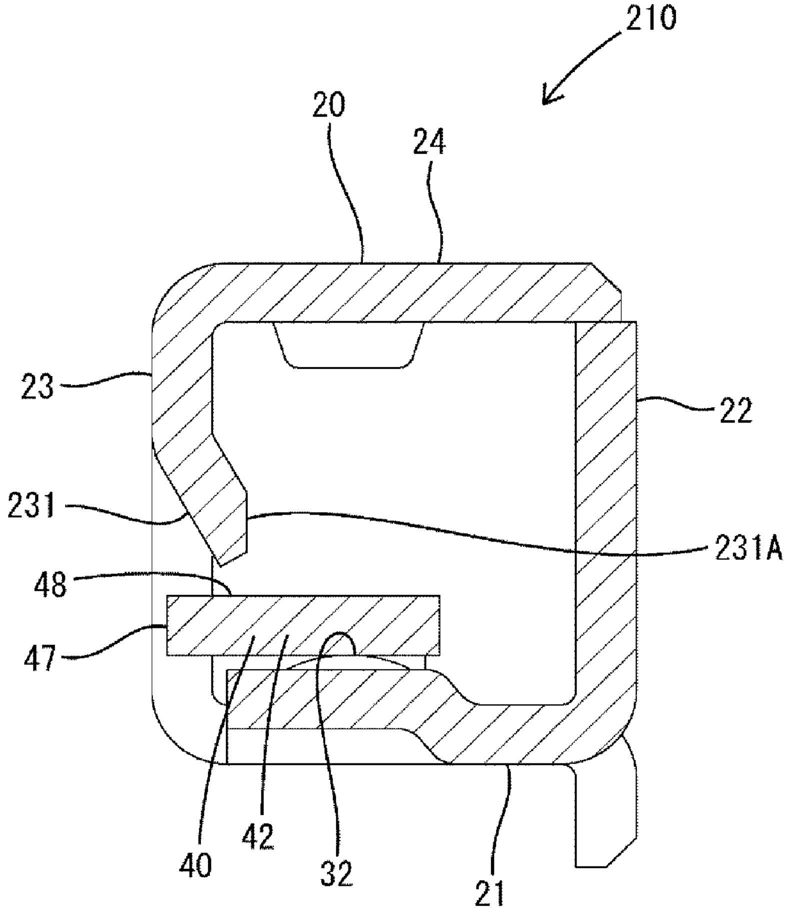
FIG. 12 is a cross-sectional view seen from a back side of the female terminal fitting of a second embodiment.

FIG. 12 is a diagram illustrating a female terminal fitting 210 of a second embodiment. In the second embodiment, the configuration of the first regulating part differs from the first embodiment. The remaining configuration is the same as the first embodiment, and detailed description thereof will be omitted.

As shown in FIG. 12, in the female terminal fitting 210, a left side portion of the distal end of a first regulating part 231 is provided with a beveled part 231A. The beveled part 231A is formed by faceting the corner part on the left side of the distal end of the first regulating part 231.

Third Embodiment

Figure 13:
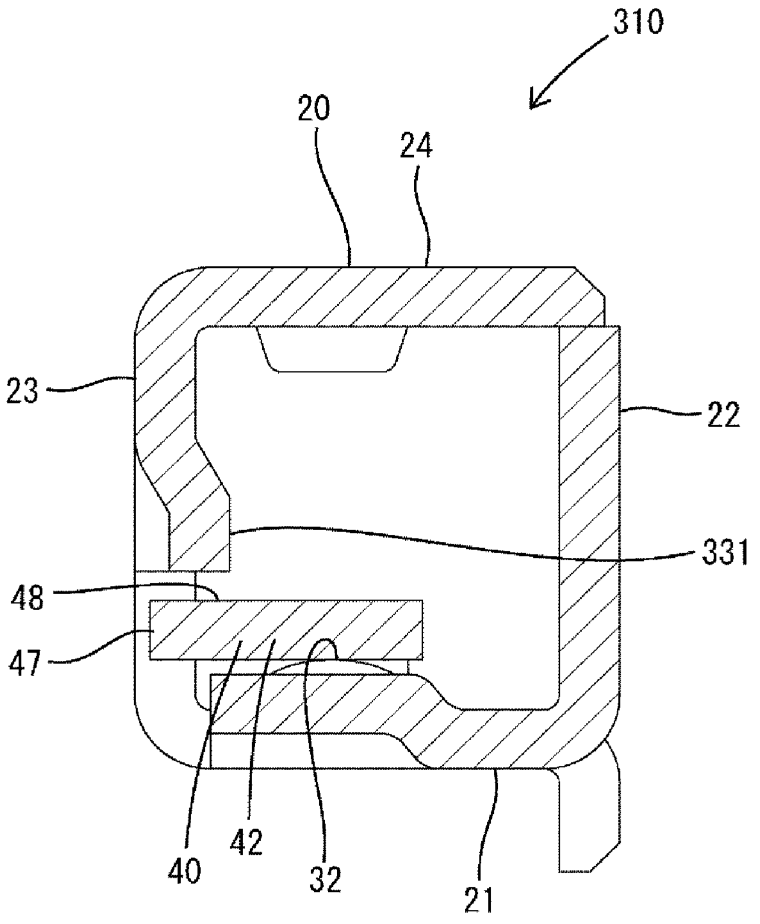
FIG. 13 is a cross-sectional view seen from a back side of the female terminal fitting of a third embodiment.
Figure 14:
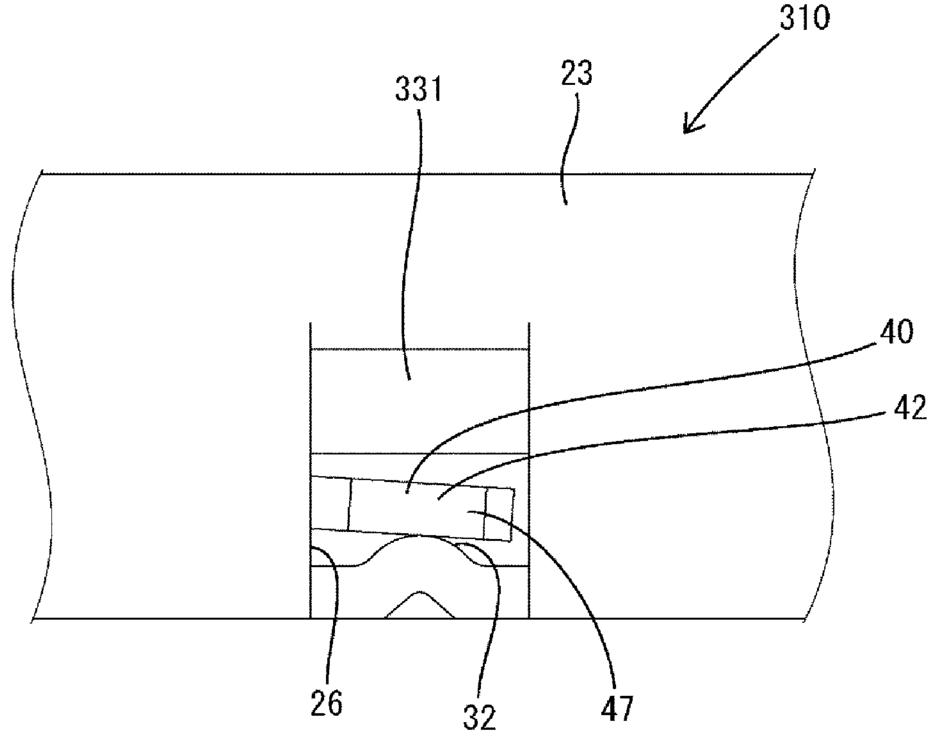
FIG. 14 is a right side view of the periphery of a right rear opening in the female terminal fitting of the third embodiment.

FIGS. 13 and 14 are diagrams illustrating a female terminal fitting 310 of a third embodiment. In the third embodiment, the configuration of the first regulating part differs from the first embodiment. The remaining configuration is the same as the first embodiment, and detailed description thereof will be omitted.

As shown in FIGS. 13 and 14, a first regulating part 331 formed by being hammered out is provided in the female terminal fitting 310. The first regulating part 331 is formed by part of the right side plate 23 (upper edge part of right rear opening 26) being inwardly hammered out. Unlike the first embodiment, there are no slits front and rear of the first regulating part 331, and the first regulating part 331 and the right side plate 23 are continuous in the front-rear direction.

Other Embodiments

The present invention is not limited to the first to third embodiments described above with reference to the drawings, and is defined by the claims. All changes that come within the meaning and range of equivalency of the claims are intended to be embraced in the invention, and embodiments such as the following are also intended to be embraced therein.

In the above first to third embodiments, configurations in which the displacement range of the rear side projecting part 47 is regulated by the first regulating parts 31, 231 and 331 are provided on the right edge part side of the main body part 20, but may also be provided on the left edge part side of the main body part 20. That is, a left side edge part of the rear end part side of the elastic contact piece 40 may be provided with a projecting part similar to the rear side projecting part 47, and an opening similar to the right rear opening 26 may be provided at a position on the rear end part side of the left side plate 22.

LIST OF REFERENCE NUMERALS

10, 210, 310 Female terminal fitting
20 Main body part

20A Insertion side
20B Non-insertion side
21 Bottom plate
21A Lance hole
21B Protruding part
22 Left side plate
22A Left front opening
22B Extension piece
23 Right side plate (side plate)
24 Top plate
24A Front side engaging plate
24B Tab receiving part
24C Tab entry space (insertion path)
25 Right front opening
26 Right rear opening (hole)
31, 231, 331 First regulating part (bent part, regulating part)
32 Second regulating part (regulating part)
40 Elastic contact piece
41 Support point part (bent part)
42 Free end part
44 Extension part
44A Front inclining part
44B Rear inclining part
45 Contact point part
46 Front side projecting part
47 Rear side projecting part (projecting part)
48 Region (extended region)
50 Wire connecting part
110 Male terminal fitting
120 Male tab
231A Beveled part

What is claimed is:

1. A female terminal fitting comprising:

a tubular main body portion; and an elastic contact piece provided inside the main body portion and deflectively deforming in a plate thickness direction, wherein the main body portion has a side plate, the side plate is provided with a hole, an edge portion of the hole is provided with a bent portion bent to an inner side of the main body portion, the elastic contact piece has:

a support point portion continuous with the main body portion;

a contact point portion extending from the support point portion to be in contact with a male tab inserted into the tubular main body portion;

a free end portion extending from the contact point portion in a direction opposite to the support point portion;

a projecting portion projecting from the free end portion and positioned in the hole; and a region opposing the bent portion in the plate thickness direction of the elastic contact piece together with the projecting portion, and the bent portion is a cantilever-like protruding piece protruding from the edge portion of the hole.

2. The female terminal fitting according to claim 1, wherein the bent portion is bent to the inner side of the main body portion so as to incline relative to a plate surface of the side plate.

3. The female terminal fitting according to claim 2, wherein the bent portion has a bending angle of 45 degrees or less with respect to the plate surface of the side plate.

4. The female terminal fitting according to claim 1, wherein the bent portion is bent avoiding an insertion path of the male tab within the main body portion.

5. The female terminal fitting according to claim 4, wherein the main body portion is divided into an insertion side on which the insertion path is arranged and a non-insertion side, via the elastic contact piece, and the bent portion is located on the insertion side of the main body portion.

6. The female terminal fitting according to claim 1, wherein the main body portion further has a regulating portion that comes into contact with the elastic contact piece and regulates a displacement range of the elastic contact piece to less than or equal to a plate thickness of the elastic contact piece.

7. The female terminal fitting according to claim 1, wherein the main body portion further has a regulating portion that comes into contact with the free end portion, the elastic contact piece is disposed between the bent portion and the regulating portion, and a distance between the projecting portion and the bent portion is less than a plate thickness of the elastic contact piece.

8. The female terminal fitting according to claim 7, wherein a sum of the distance between the projecting portion and the bent portion and a distance between the projecting portion and the regulating portion is less than the plate thickness of the elastic contact piece.

* * * * *